(No Model.)
J. R. KELLY.
COMBINED PLANTER AND FERTILIZER DISTRIBUTER.
No. 513,940. Patented Jan. 30, 1894.
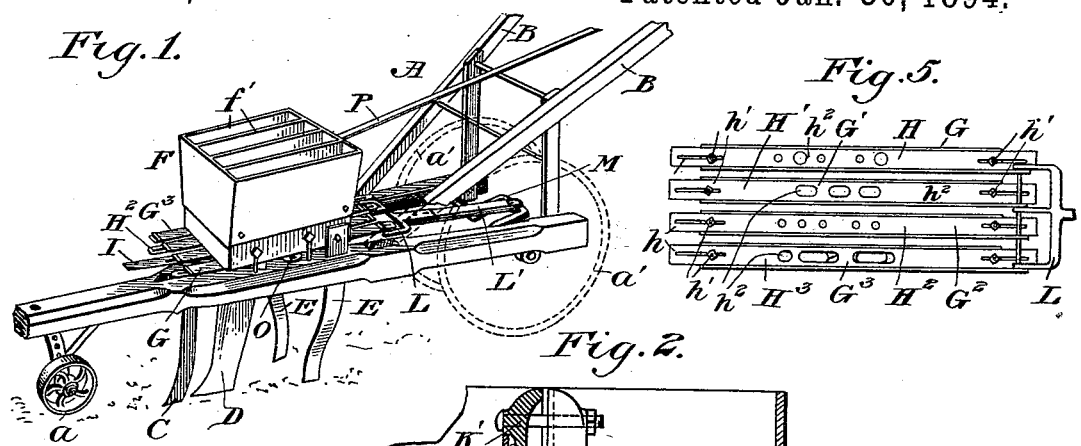
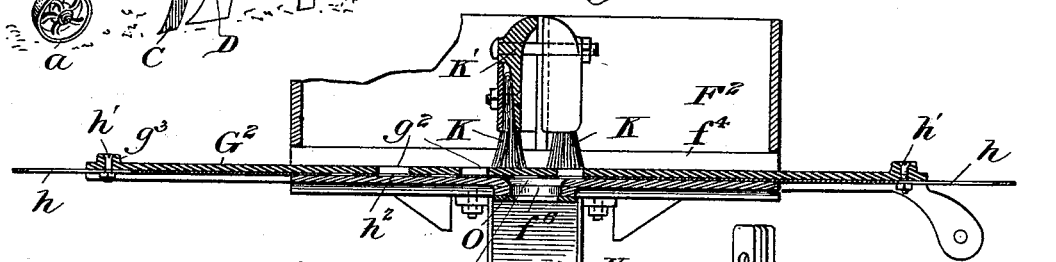
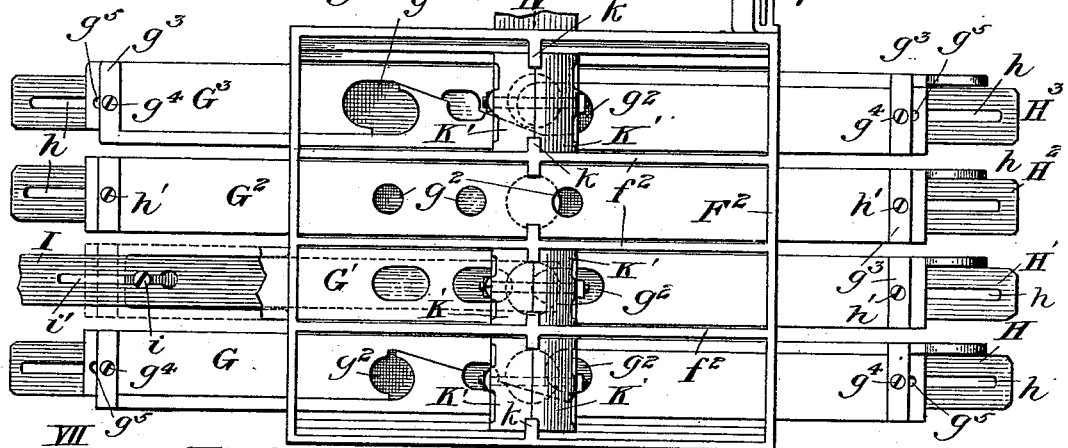
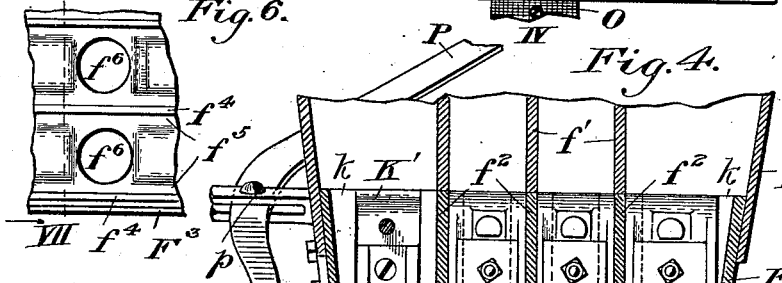
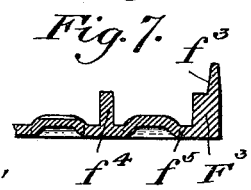
Witnesses
L. A. Comer Jr.
Chas. E. Riordon
Inventor
Jas. R. Kelly
By Butterworth
and Dowell
his Attorneys.

UNITED STATES PATENT OFFICE.

JAMES R. KELLY, OF SARVERSVILLE, PENNSYLVANIA.

COMBINED PLANTER AND FERTILIZER-DISTRIBUTER.

SPECIFICATION forming part of Letters Patent No. 513,940, dated January 30, 1894.

Application filed April 20, 1893. Serial No. 471,154. (No model.)

*To all whom it may concern:*

Be it known that I, JAMES R. KELLY, a citizen of the United States, residing at Sarversville, in the county of Butler and State of Pennsylvania, have invented certain new and useful Improvements in a Combined Planter and Fertilizer-Distributer; and I do hereby declare the following to be a full, clear, and exact description of the invention, such as will enable others skilled in the art to which it appertains to make and use the same.

This invention relates to seed planters, and more particularly to a class of machines known as "walking planters."

The object of the invention is to provide improved means for planting corn, beans, pumpkin and other seed, and simultaneously distributing fertilizing material, the operative parts of the planting mechanism being capable of adjustment to vary the distance between the hills at will.

The invention will first be described with reference to the accompanying drawings, which form a part of this specification, and then particularly pointed out in the claims at the end of this description.

Referring to the drawings, in which similar letters of reference are used to denote similar parts in each of the several views, Figure 1 represents a perspective view of a seed-planter embodying my invention. Fig. 2 is a detailed vertical sectional elevation taken through one of the compartments of the seed hopper. Fig. 3 is a plan of the lower portion of the seed hopper, showing the seed slides working therein. Fig. 4 is a cross section taken on the line IV—IV of Fig. 3. Fig. 5 is a bottom plan, showing the seed slides detached. Fig. 6 is a detailed fragmentary view, showing a portion of the corrugated bottom of the seed-hopper; and Fig. 7 is a section taken on line VII—VII of Fig. 6.

The frame A, of the machine may be of the form shown or of any desired construction, and is provided with the usual gage-wheel $a$, at the forward end of the plow beam, and with the drive wheels $a'$, $a'$, (shown in dotted lines) at the rear thereof, and with rearwardly extending handles B, B.

C, denotes a cutter, or colter which is placed in advance of the furrow-opener or plow D, and E, E, are coverers arranged in rear of said plow. The plow D, is arranged beneath the hopper F, and is constructed with a standard having a tubular cross section to form a seed-spout having an open upper end into which the seed and fertilizer are conducted.

The seed hopper F, is preferably constructed in three parts, F', $F^2$, $F^3$. The part F', may consist of a box-like structure of tin or any suitable material having an open bottom and top and provided with a number of partitions $f'$, forming the several compartments to receive the different kinds of seed and fertilizer. The box F' is arranged over and secured in any proper manner to the intermediate portion $F^2$, which latter is a similar box-like construction with open bottom and top and a number of partitions $f^2$, corresponding with the partitions in the box F'. It is preferably made of cast iron. The part $F^3$, constitutes the bottom of the hopper, and consists preferably of a cast or wrought metal corrugated plate, having upturned or side flanges $f^3$, to which the hopper section $F^2$, is bolted or otherwise secured, and intermediate longitudinal ribs or ridges $f^4$, corresponding in number with the partitions $f^2$, of the hopper section $F^2$, fitting thereon. The hopper is thus formed with several compartments corresponding with the arrangement of the seed slides working in the bottom thereof, and is provided with a discharge aperture $f^6$, underneath each slide. The corrugated form of the bottom of the hopper provides grooves or bearings $f^5$, within which work the depending edges or side flanges of the seed slides G, G', $G^2$, $G^3$, the latter being preferably formed from grooved or channeled iron, for a purpose to be described. Four of these slides are shown in the drawings, but a greater or less number may be used, if desired. The slide G, is designed for planting corn, and the slide G', for pumpkin seed; the slide $G^2$, for beans, and the slide $G^3$, for fertilizer. The several slides are each provided with an adjustable regulating bar marked H, H', $H^2$, $H^3$, respectively, and which are fitted and secured in the grooved or channeled face of the slide on the under side thereof; the connection being made by slotting the regulating bar longitudinally as at $h$, to receive a set screw or bolt $h'$, by which the said bars may be adjusted longitudinally and secured in the desired position in respect to the slides.

The corn and fertilizer slides G, $G^3$, are formed in two parts or halves having apertures $g^2$, which are formed by providing a recess in each of said parts registering with the corresponding recess in the opposite half when the two halves are connected, as shown, so that by sliding said parts longitudinally, the size of the feed aperture may be varied to adapt the same to seed of different sizes, or to regulate the quantity of seed sown. This adjustment may be secured by providing at each end of the slide a laterally extending projection $g^3$, on one part overlapping the other part, which latter is provided with an elongated slot $g^5$, and a screw or bolt $g^4$ passing through the projection and slot secures the parts together and permits the desired adjustment. Each slide has preferably three openings $g^2$, varying in size to meet different requirements in the sizes of the seed, as beans, corn, pumpkin, &c. The regulating bars H, H′, $H^2$, $H^3$, are provided with five, more or less, openings, $h^2$, adapted to register with the openings $g^2$, of the seed and fertilizer slides when properly adjusted and to cut off or close any one or more or all, if desired, of said openings.

The pumpkin slide G′, may have but a single aperture $g^2$, instead of three as shown and a cut-off bar I, is secured to the bottom of the hopper by means of a set screw $i$, passing through a longitudinal slot $i'$, in the cut-off bar, so that when desired the aperture $f^6$, in the bottom of the hopper registering with the aperture $g^2$, in the pumpkin slide, when the latter moves over the same, may be closed temporarily at intervals for the purpose of planting pumpkin seed in different rows alternately with other seed when desired.

K, K, denote brushes of the usual construction, which are fitted in the intermediate section $F^2$, of the hopper over and at either side of the discharge apertures in the hopper bottom and seed and fertilizer slides, so as to prevent more than the required amount of seed or fertilizer from being sown. These brushes may be secured in any proper manner within the several compartments of the hopper. In the present instance, two brushes are provided, one at either side of the transverse center of the hopper, or immediately in front and in rear of the discharge apertures, and are held in proper position by means of a two-part clamp K′, which may be bolted to ribs or flanges $k$, $k$, projecting from the inner walls of the hopper section $F^2$, and the sides of the partitions $f^2$, therein.

The several slides G, G′, $G^2$, $G^3$, have their rear ends pivoted to a cross-bar or bail L, from which a rod or pitman L′, extends to a crank M, upon the axle of the driving wheel or wheels $a'$, by which the desired reciprocating movement is imparted simultaneously to the several slides. This crank movement is so timed that when the first and third openings $g^2$, in the slides are uncovered, the machine will plant in hills two feet apart. When one only of said openings is uncovered, the hills will be three feet apart; and when all of the openings are uncovered, the hills will be one foot apart. By properly adjusting the slides and regulating bars, the machine may be adapted to plant from one to six grains of corn, from one to three feet apart, and two or three beans in a hill the same distance as the corn. Or the beans may be planted between the hills of corn. The pumpkin seed slide may also be so adjusted as to plant from two to four seed in hills the same as the beans and from one to three feet apart, or separately between the hills of corn. Or the corn and pumpkin seed may be planted together, or the corn, beans and pumpkin seed may all be planted in the same hills, and at the same time the fertilizer may be sown in the hills or between the same. The discharge apertures $f^6$, in the bottom, or section $F^3$, of the seed hopper, may discharge into the upper end of a feed spout leading to or directly into the tubular plow standard D. Chutes N, N, are provided at either side of the upper end of the spout or standard to conduct the seeds and fertilizer from the respective compartments of the hopper into the upper end of the spout.

In conveying the machine from place to place, or in turning corners at the ends of rows, when it is not desired to plant, the several discharge openings $f^6$, may be closed by means of a cut-off bar or slide O, passing transversely underneath the bottom of the hopper, and provided with a series of apertures $o$, adapted to register with the discharge apertures $f^6$, when the parts are in proper position. The cut-off O, is pivoted to the short arm of a lever P, which is fulcrumed in a bracket $p$, projecting from the side of the hopper, and has its rear end extended back in position to be readily grasped by the operator, for the purpose of opening or closing the discharge apertures when desired, and may be secured after adjustment in any proper manner.

To prevent the discharge openings of the fertilizer compartment from clogging, a clearer Q, (Fig. 4) may be provided, consisting of a gravity finger loosely supported by grate bars secured to the inner sides of the fertilizer compartment so as to allow the finger to rise and fall by gravity directly over the discharge aperture and between the two brushes in said compartment, so as to keep the openings clear.

Having thus fully described my invention, what I claim as new, and desire to secure by Letters Patent of the United States, is—

1. In a seed planter, the reciprocating slide, consisting of a grooved or channeled bar having a series of openings therein, and an adjustable regulating bar fitting the channeled face of said slide and provided with a series of apertures adapted to register with any one or more of said openings as may be desired, substantially as described.

2. In combination with the hopper having a series of seed compartments with discharge openings therein, a reciprocating slide for each compartment having a series of discharge apertures, regulating bars adjustably secured to said seed slides and provided with apertures whereby any one or more of the apertures in the slides may be opened or closed, and means for imparting motion to the slides, substantially as described.

3. In a seed planter, the combination with the hopper having the longitudinally ribbed and corrugated bottom, of the reciprocating seed slides composed of grooved or channeled bars having their depending edges or flanges working in said grooves, substantially as described.

4. In a seed planter, the combination with the hopper having the corrugated bottom with guide grooves or bearings extending longitudinally thereof, the seed slides composed of channeled or grooved bars having their depending edges or flanges fitted to work in said grooves, and regulating bars adjustably secured to said seed slides and fitting the channeled faces thereof, substantially as described.

5. A combined seed planter and fertilizer distributer, comprising a suitable frame, a hopper mounted thereon and provided with a series of compartments each having a discharge opening therein, a series of reciprocating seed slides each provided with a series of apertures of different sizes, a corresponding series of adjustable bars secured to said seed slides and provided with apertures therein adapted to register with any one or more of the apertures in the slides, brushes fitted in said compartments of the hopper over said discharge openings, a driving wheel or wheels, a crank on the axle thereof, and a rod or pitman connecting said slides and crank, whereby a simultaneous reciprocatory movement is imparted to the slides, substantially as described.

6. In a seed planter, the combination with the hopper having the several compartments with discharge openings therein, of a series of seed slides, one for each compartment, each provided with a series of apertures, the apertures of different slides being of different sizes to adapt the machine for planting various kinds of seed, a cut-off bar controlling the several discharge openings, and a hand-lever for shifting said cut-off bar so as to open or close said openings at will, substantially as described.

7. In combination with the seed-hopper having the several compartments therein, a corresponding series of slides having apertures of different sizes to adapt the same to seed of different sizes, mechanism for simultaneously reciprocating the several slides, and means for closing any one or more of the apertures in each of the several slides so as to regulate the amount of seed sown and vary the distance between the hills or the rows in which different kinds of seed are planted, substantially as described.

8. In a seed planter, the hopper composed of three parts or sections secured one upon the other, the upper and intermediate sections being constructed in box-like form with open top and bottom and each provided with a series of partitions corresponding with the partitions in the adjacent section, together with a lower section forming the bottom of the hopper, and consisting of a corrugated plate having discharge openings therein, and upturned edges or side flanges and intermediate longitudinal ribs corresponding with the arrangement of partitions in the superimposed sections, substantially as described.

9. The seed hopper having a series of compartments therein, and provided with a corrugated bottom having suitable discharge openings, and up-turned edges or side flanges and intermediate longitudinal ribs or ridges corresponding with the compartments of the hopper, in combination with a series of apertured reciprocating slides confined between said flanges and ribs, and mechanism for reciprocating the slides, substantially as described.

10. In a combined planter and fertilizer distributer, the combination with the seed hopper having a series of compartments therein provided with suitable discharge openings, a pair of slides working in two of said compartments each having two or more openings therethrough and means for enlarging or contracting said openings at will, additional slides working in the other compartments and having openings of different sizes for different kinds of seed, an adjustable regulating bar for each of said slides provided with a series of apertures adapted to register with one or more of the apertures in the respective slides while the remaining apertures thereof are closed, and a cut-off bar for closing the discharge from one of said compartments independently of the others, substantially as described.

11. In a combined planter and fertilizer distributer, the combination with the seed hopper having a series of compartments therein provided with suitable discharge openings a pair of slides working in two of said compartments, each having two or more openings therethrough and means for enlarging or contracting said openings at will, additional slides working in the other compartments and having openings of different sizes for different kinds of seed, an adjustable regulating bar for each of said slides provided with a series of apertures adapted to register with one or more of the apertures in the respective slides while the remaining apertures thereof are closed, a cut-off bar for closing the discharge from one of said compartments independently of the others, a second cut-off bar for simultaneously closing the discharge openings of the several compartments, and a hand-lever for actuating the latter cut-off, substantially as described.

In testimony whereof I affix my signature in presence of two witnesses.

JAMES R. KELLY.

Witnesses:
 THOS. DOUGLASS,
 WILLIAM H. GLER.